(12) United States Patent
Ariel

(10) Patent No.: US 8,981,608 B2
(45) Date of Patent: Mar. 17, 2015

(54) METHOD OF PROPULSION

(76) Inventor: Harold Ariel, Long Beach, CA (US)

( * ) Notice: Subject to any disclaimer, the term of this patent is extended or adjusted under 35 U.S.C. 154(b) by 534 days.

(21) Appl. No.: 13/066,670

(22) Filed: Apr. 21, 2011

(65) Prior Publication Data

US 2012/0267973 A1 Oct. 25, 2012

(51) Int. Cl.
*H02K 7/02* (2006.01)
*H02K 7/06* (2006.01)
*H02K 53/00* (2006.01)
*H02K 99/00* (2014.01)
*F03G 7/10* (2006.01)

(52) U.S. Cl.
CPC .............. *H02K 53/00* (2013.01); *H02K 7/06* (2013.01); *H02K 57/006* (2013.01); *F03G 7/10* (2013.01)
USPC ........................................ 310/103

(58) Field of Classification Search
USPC ........................................ 310/103
See application file for complete search history.

(56) References Cited

U.S. PATENT DOCUMENTS

| | | | | |
|---|---|---|---|---|
| 3,568,030 A * | 3/1971 | Faxon | ................. | 318/696 |
| 3,831,537 A * | 8/1974 | Siegel | ................. | 112/220 |
| 3,899,703 A * | 8/1975 | Kinnison | ............. | 310/103 |
| 3,935,487 A * | 1/1976 | Czerniak | ............. | 310/46 |
| 4,267,647 A * | 5/1981 | Anderson et al. | ...... | 434/301 |
| 5,182,533 A * | 1/1993 | Ritts | ................... | 335/306 |
| 5,304,881 A * | 4/1994 | Flynn et al. | ........... | 310/156.46 |
| 5,594,289 A * | 1/1997 | Minato | ................ | 310/152 |
| 5,786,645 A * | 7/1998 | Obidniak | ............ | 310/68 R |
| 6,323,576 B1 * | 11/2001 | Applegate | .......... | 310/268 |
| 6,356,000 B1 * | 3/2002 | Ho et al. | ............. | 310/154.01 |
| 6,433,452 B1 * | 8/2002 | Graham | .............. | 310/152 |
| 7,075,200 B2 * | 7/2006 | Minato et al. | ....... | 310/67 R |
| 7,808,142 B2 * | 10/2010 | Wise | ................. | 310/156.32 |
| 2005/0127767 A1 * | 6/2005 | Gallant | ................ | 310/113 |
| 2010/0314961 A1 * | 12/2010 | An et al. | .............. | 310/155 |

FOREIGN PATENT DOCUMENTS

| | | | | | |
|---|---|---|---|---|---|
| JP | 59053078 A | * | 3/1984 | ............. | H02K 37/00 |
| JP | 63018957 A | * | 1/1988 | ............. | H02K 49/00 |
| WO | WO 9417582 A1 | * | 8/1994 | ............. | H02K 37/12 |

* cited by examiner

*Primary Examiner* — Tran Nguyen

(57) ABSTRACT

One embodiment of the new method of propulsion is an electron magnetic drive with an array of rotor electromagnets (28A-28L) operating in the non inertial frame of reference produced by the rotation (33) of the rotor (26); linked by a magnetic field from the electromagnets (28A-28L) to the inertial frame of reference of the stationary stator electromagnet (40); generate a propulsive reaction force (45) in accordance with Newton's third law of motion. The electromagnets (28A-28L) mounted on the rotor (26), when energized for a time interval generate a magnetic field that engages the magnetic field of the energized stator electromagnet (40). The magnetic field engagement produces magnetic forces of attraction and repulsion with the like and unlike magnetic polarities of the energized stationary electromagnet (40) and the corresponding energized electromagnet (28A-28L) in the rotor (26).

12 Claims, 6 Drawing Sheets

METHOD OF PROPULSION

BACKGROUND

1. Field

A method that employs; the magnetic forces in the magnetic field linking Newton's third law of motion in two frames of reference to produce a reaction propulsion force.

2. Prior Art

All of the present propulsion technology is based on Newton's third law of motion; "for every action there is an equal and opposite reaction". Rockets carry their own propellant and expel it through a nozzle to produce the reaction force of propulsion. Unlike a rocket that carries its own propellant; a jet engine takes in propellant from the surrounding atmosphere, mixes it with fuel, and accelerate it through the jet engine's nozzle. A propeller utilizes; a mass of air or water from the environment and accelerate it to produce propeller thrust. An internal combustion engine with a drive train, giving power to the wheels of a land driven motor vehicle employs the traction with the ground for propulsion. The ground serves as the propellant. All these prime movers operate by action and reaction with a propellant. All these propulsion devices work by producing an action that generates a propulsive reaction with the propellant in accordance with Newton's third law of motion. Nevertheless, the requirement of propellant for propulsion is the major disadvantage and the major limitation of the current technology.

SUMMARY OF THE INVENTION

The present invention is a new method of propulsion that overcomes the major disadvantage and limitation of the current propulsion technology need for propellant. The invention employs Newton's third law of motion simultaneously in action in two frames of reference, to produce a propulsive reaction force with the magnetic forces present in the magnetic field of magnets and electromagnets. One frame of reference is a rotatable non inertial frame of reference. The other is a stationary inertial frame of reference. The source of the action is the magnetic forces that originates in the rotatable non-inertial frame of reference of a rotor. While the reaction to the magnetic force, occurs in the stationary inertial frame of reference of a stator. In the rotor, forces acting on the rotor produce rotation. Each frame of reference is governed by the laws of physics applicable in that frame of reference. Through the magnetic forces present in the magnetic field of magnets and electromagnets, an action at a distance from the magnetic source can be produced. Consequently, the synergy of the dynamic interchange between the action and the reaction between the two frames of reference linked by a magnetic field generates in the stationary frame of reference of the stator a directional reaction force useful for the propulsion of land driven motor vehicles, seafaring ships, private, commercial, military airplanes, satellites, and the like.

In addition, as it pertains to the physics of frames of reference, a body at rest in a stationary position or a body in motion in a straight line at a constant velocity with no acceleration represents an inertial frame of reference. Similarly, a body in motion with an acceleration; such as a spinning disk, represents a non-inertial frame of reference. As a non-inertial frame of reference, in a disk spinning about its own geometric center as the center of revolution, all the particles in the spinning disk have a radial acceleration toward the center of the disk.

In the frame of reference of a propulsion platform, such as a base frame, a stationary body in the base frame, such as a stator, represents an inertial frame of reference in that platform. The stator can be made of a magnetic permeable material, any suitable material on which a magnetic polarity may be induced; or it can also be made of a high permeability ferromagnetic material, a permanent magnet, or an electromagnet.

Mounted on the same base frame, is an axle with a disk shaped rotor pivotally mounted for rotation about the axle. The axle works as the center of revolution for the rotor. The rotor is symmetric about the axle. During the gyrations of the rotor about the center of revolution; the number of bodies mounted on the rotor are in a state of radial acceleration toward the center of the rotor. A permanent magnet, an electromagnet or any source of magnetic field mounted on the spinning rotor is also in a similar condition of radial acceleration toward the center of the rotor.

The method of propulsion employs a rotatable platform in the form of a disk shaped rotor spinning about an axle selected as the center of revolution. The rotor is pivotally mounted for rotation on the axle, symmetric about the axle, with a plurality of electromagnets radially spaced from the axle, and angularly spaced about the axle. Each of the electromagnets in the rotor is momentarily energized to produce an electromagnetic field for a predetermined length of time as each electromagnet pass by the stator. The electromagnets in the rotor produce a magnetic field that generate magnetic forces of attraction with a magnetic permeable body, and magnetic forces of attraction and repulsion in the interaction with a permanent magnet, or another electromagnet in the stator, accordingly. The magnetic forces of attraction and repulsion act on the stator and generate a directional reaction force in accordance with Newton' third law affirming that every action from the rotor produces a reaction of equal magnitude in the opposite direction in the stator. In the rotor, the magnetic forces of attraction and repulsion generate a motive force that produces a torque to drive the gyrations of the rotor about the axle. The gyrations of the rotor make the rotor a non-inertial frame of reference for the operation of the electromagnets in the rotor. As a consequence of the rotor gyrations, the magnetic field and therefore the magnetic forces that originates from the electromagnets on the spinning rotor also operate under the influence of the non-inertial frame of reference of the spinning rotor.

One embodiment of the method employs the magnetic field present in each of a plurality of permanent magnets mounted on the rotor to act on a stator electromagnet. The gyrations of the magnets with the rotor create a non-inertial frame of reference for the magnetic field of the permanent magnets on the rotor. The reaction force on the stator electromagnet, produce a reaction force on the stator in accordance with Newton's third law of motion. The reaction on the stator is a directional force useful for propulsion.

In the descriptions of the invention, a commutator for the distribution of electric power from a power supply to the electromagnets mounted on the rotor of the electron magnetic drive is omitted. The method of propulsion can be explained without the descriptive details of commutation for the distribution of the electricity necessary to energize the electromagnets in the rotor. The invention employs the action at a distance capability of the magnetic field and therefore the magnetic flux of magnets and electromagnets to produce a reaction in accordance with Newton's third law of motion. The novelty of the invention is a fresh new approach to propulsion.

It is an object of the invention to utilize the magnetic forces present in the electromagnetic field of electromagnets and in the magnetic field of permanent magnets to produce a reaction force useful for propulsion.

It is an object of the invention to provide in a propulsion platform, the proper combinatory relationships between the electromagnets in a spinning rotor and a stationary high magnetic permeability stator, to utilize the magnetic forces in the magnetic field of the electromagnets to act on the stationary magnetic permeable stator, to produce a directional propulsive reaction force that will propel the entire platform and any vehicle of which the platform is part of.

It is an object of the invention to provide in a propulsion platform, the proper combinatory relationships between a plurality of electromagnets in a spinning rotor and the stationary electromagnet in a stator to utilize the magnetic forces present in the electromagnets to produce a directional reaction force in the stationary stator electromagnet for the propulsion of the entire platform and any vehicle of which the platform is part of.

It is an object of the invention to provide in a propulsion platform, the proper combinatory relationships between a plurality of permanent magnets mounted on a rotor and the stationary electromagnet in a stator, in order to utilize the magnetic forces present in the electromagnetic field of the electromagnet in the stator, and in the magnetic field of the permanent magnets in the rotor, in order to produce a reaction force in the stationary stator electromagnet for the propulsion of the entire platform and any vehicle of which the platform is part of.

DRAWINGS

Figures

The abovementioned objects and advantages will be appreciated from the following descriptions and the drawings herein.

FIG. 1 schematic shows a tangential force on the periphery of a rotatable disk producing a torque to drive the gyrations of the disk about a central axle.

Figure 10:
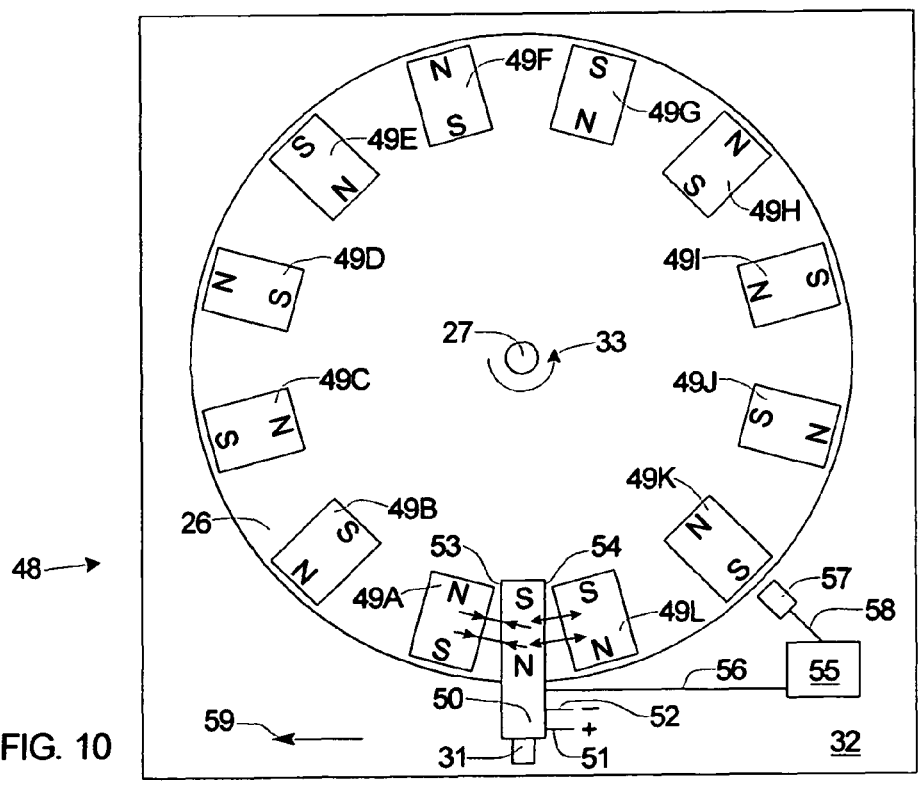
FIG. 10 is a new electron magnetic drive with the improvement comprising plurality of permanent magnets mounted on the rotor and a controllable magnetic polarity stator electromagnet under the control of an electronic controller.
Figure 11:
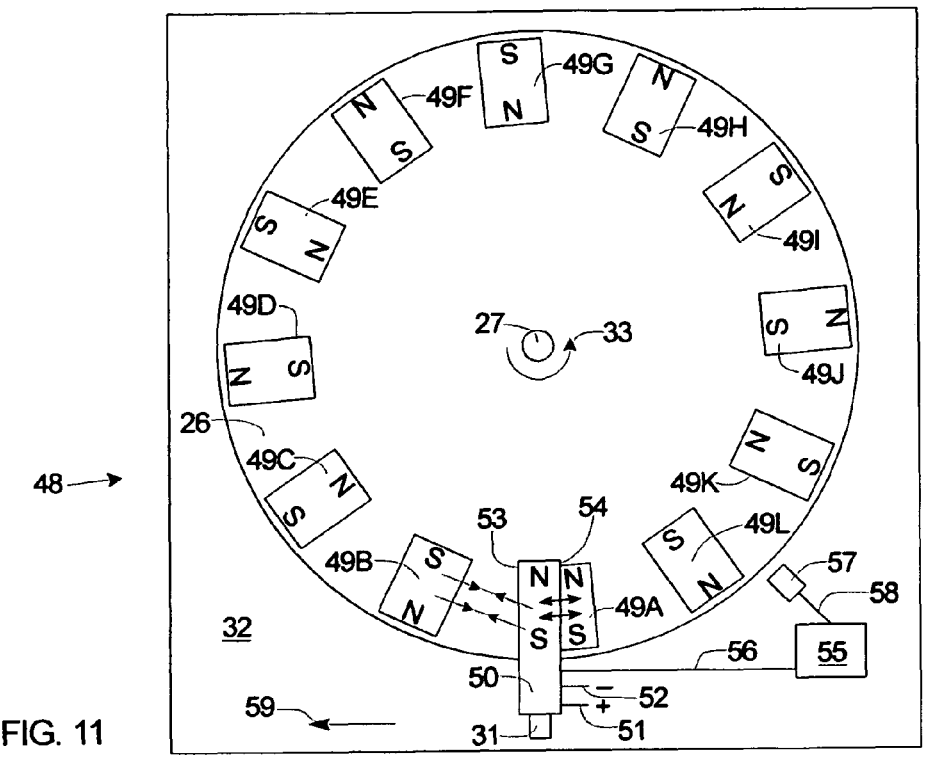

FIG. 11, a continuation of FIG. 10 shows the stator electromagnet interacting with the rotor magnets in a new displacement position relative to the previous position in FIG. 10.

Figure 12:
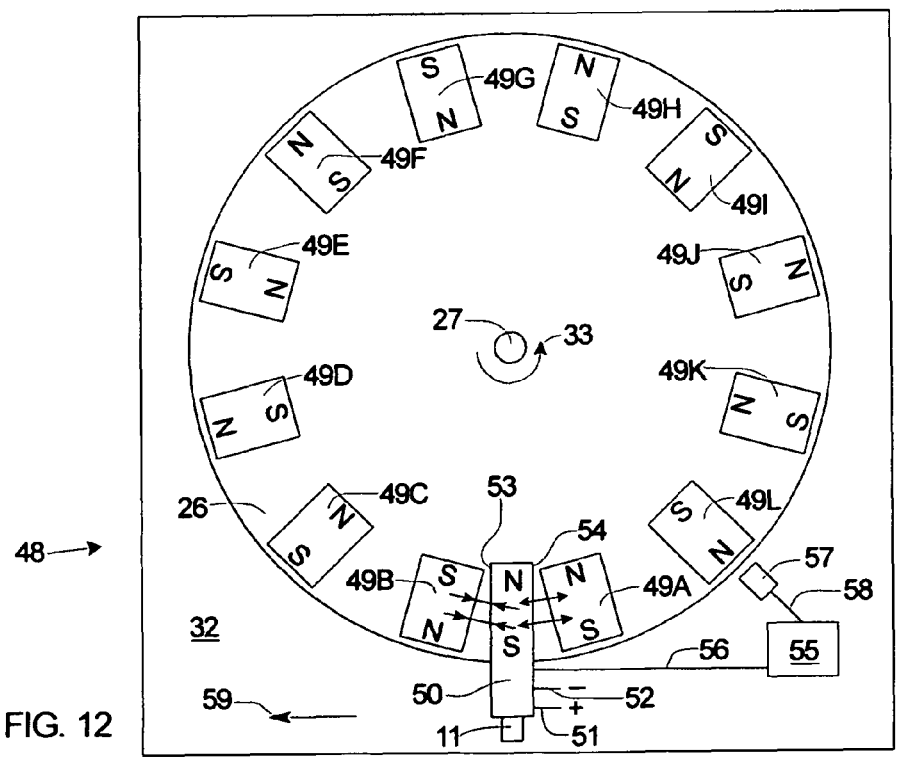

FIG. 12 is a continuation of FIG. 11 showing the change in the magnetic polarity of the stator electromagnet in order to interact suitably with the rotor magnets, with a further displacement to a new position relative to the previous position in FIG. 11.

DETAILED DESCRIPTION OF THE PREFERRED EMBODIMENTS

Figure 1:
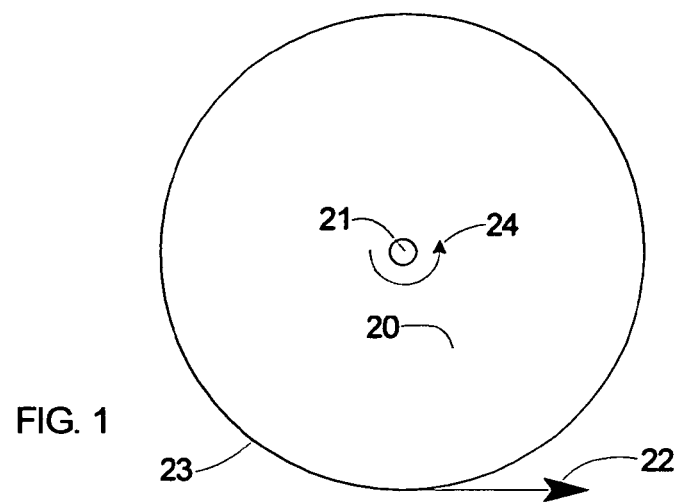

FIG. 1 illustrates a principle of practice in the operation of the invention comprising a rotatable circular disk 20 pivotally mounted for rotation on an axle 21. A force 22 tangent to the periphery 23 of the disk 20 is a motive force that impresses upon the disk 20 a torque that generates the rotation 24 about the axle 21.

FIGS. 2-5

To illustrate an embodiment of the method of propulsion, FIGS. 2-5 show the schematics of an electron magnetic drive 25 comprising a rotor 26 pivotally mounted for rotation on a central axle 27. Mounted on the rotor 26 is a plurality of rotor electromagnets 28A-28L, and each of the electromagnets 28A-28L has power input terminals 29 and 30. A stator support member 31 mounted on a base frame 32 provides mounting support for a stator 34. An arrow indicates the counter-clockwise direction of a rotation 33 of the rotor 26 about the axle 27. The stator 34, made of a magnetic permeable material comprises a leading side 35 facing the oncoming traffic flow of electromagnets 28A-28L passing by the stator 34, and a trailing side 36 facing the outgoing traffic of electromagnets 28A-28L moving away from the stator 34. In the frame 32, the stator 34 is a stationary inertial frame of reference on which the magnetic field and therefore the magnetic forces produced by the electromagnets 28A-28L act upon. The traffic flow of the electromagnets 28A-28L passing by the stator 34 come about as the result of the magnetic forces of attraction between the electromagnets 28A-28L and the stator 34 during the time interval the electromagnets 28A-28L are energized, causing the rotation 33 of the rotor 26 about the axle 27. The magnetic forces of attraction between an energized electromagnets 28A-28L generate a reaction force 37 in the stator 34. The force 27 is equal in magnitude and opposite in direction to the forces produced by the applicable energized electromagnet 28A-28L. The reaction to the magnetic forces from the energized electromagnets 28A-28L occurs in the stator 34 in compliance with Newton's third law of motion.

Figure 2:
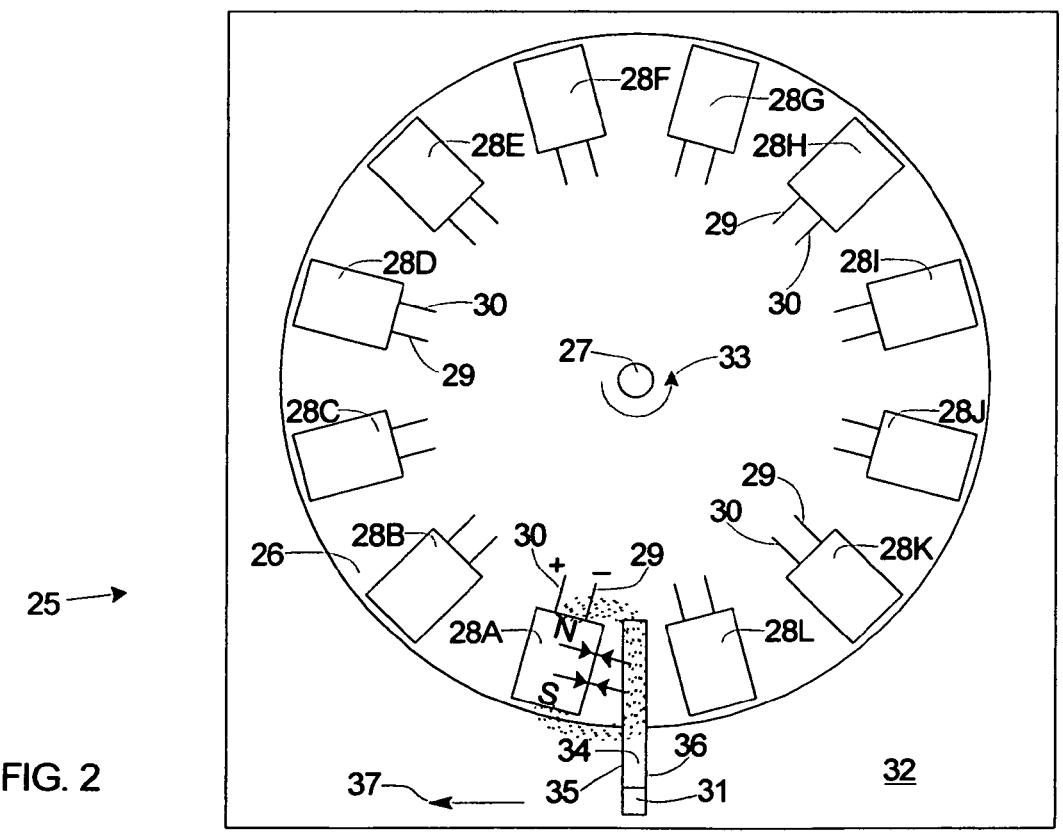
FIG. 2 is the schematic of an electron magnetic drive showing a base frame platform with a rotor carrying a plurality of electromagnets; with one electromagnet energized to produce a magnetic flux travelling through the body of a magnetic permeable stator.
Figure 3:
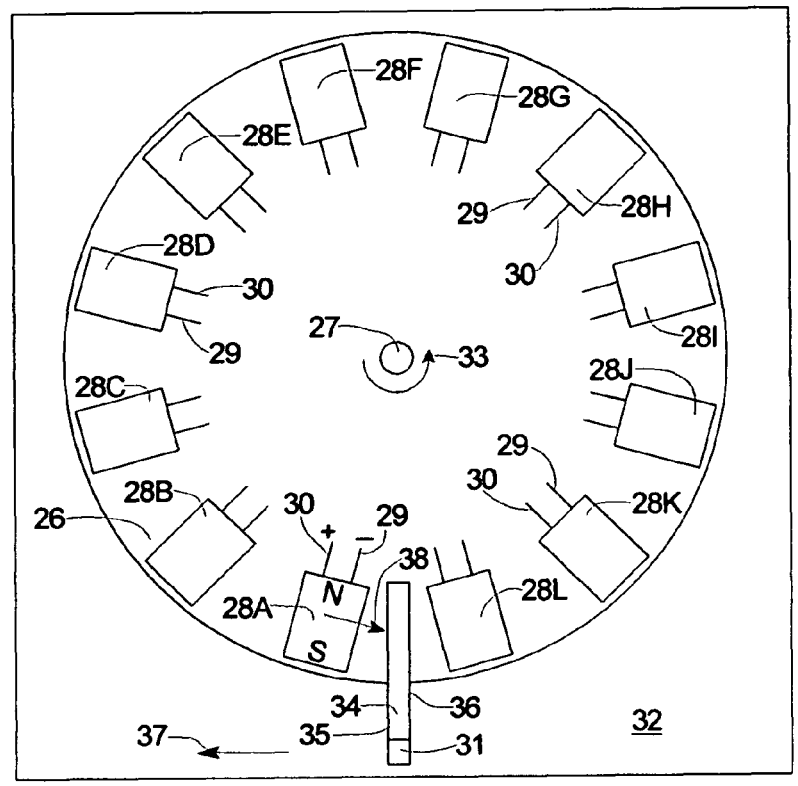
FIG. 3 is a continuation of FIG. 2 to show the tangential vector force component of the magnetic attraction force that generates the torque to drive the gyrations of the rotor about a central axle.

In FIG. 2 only, the magnetic flux of the energized electromagnet 28A is shown with dotted lines. FIG. 2 also shows the action of the magnetic forces of attraction between any energized electromagnets 28A-28L, and in this particular case, the energized electromagnet 28A, and the stator 34. The magnetic forces of attraction are symbolized with sets of double arrows pointing toward each other. During the time interval any of the electromagnets 28A-28L is energized, the electric power input terminals 29 and 30 display the plus (+) and minus (−) signs to indicate the positive and negative polarities of the electric power input. During the propulsive thrust output operation of the magnetic drive 25, when energized, the electromagnets 28A-28L produce a magnetic field. The polarity of the magnetic field produced is shown with the letters N for the North magnetic Pole, and S for the South magnetic Pole.

In the magnetic drive 25, the axle 27 is mounted on the base frame 32. The rotor 26 is symmetric about the axle 27 and pivotally mounted for rotation about the axle 27. During the thrust output operation of the drive 25, the rotation 33 of the rotor 26 transforms the rotor 26 into a non-inertial frame of reference for the operation of the electromagnets 28A-28L. In the rotor 26, the electromagnets 28A-28L are mounted radially spaced from the axle 27, and angularly spaced about the axle 27.

In the descriptions that follow, a commutator for the distribution of electric power to energize the electromagnets 28A-28L in the rotor 26 is omitted. The method of propulsion can be explained without the descriptive details of commutation for the distribution of the electricity necessary to energize the electromagnets 28A-28L in the rotor 26.

Operation

FIG. 2

FIG. 2 shows the application of the principle disclosed in FIG. 1 by mounting the electromagnets 28A-28L on the rotor 26 at a radial distance from the axle 27, near the periphery of the rotor 26. The axle 27 is the center of revolution for the rotor 26 and the electromagnets 28A-28L. By mounting the electromagnets 28A-28L at a radial distance away from the axle 27, the magnetic forces produced by the electromagnets 28A-28L generate tangential force components that combined with the radial displacement from the axle 27 produce the torque that drive the rotation 33 of the rotor 26 carrying the electromagnets 28A-28L in orbit about the axle 27. FIG. 2 shows with dotted lines, the magnetic flux produced by the energized electromagnet 28A. The energized state of the electromagnets 28A-28L is shown with the plus (+) and minus (−) signs on the terminals 29 and 30. The electromagnet 28A magnetic flux comes out from the South magnetic Pole; marked with the letter S, goes into the body of the stator 34 and travels through the magnetic permeable material of the stator 34, to come out the other end of the stator 34, and then back to the electromagnet 28A North Pole, marked with the letter N. The journey of the magnetic flux through the body of the stator 34 generates a magnetic attraction force between the electromagnet 28A and the stator 34. The magnetic forces of attraction between the electromagnet 28A and the stator 34 are shown with double arrows pointing toward each other. The magnetic field of the energized electromagnet 28A generates a flow of magnetic field referred as the magnetic flux. The magnetic flux is shown with dotted lines. With the magnetic flux, the electromagnet 28A engages the stator 34 and pulls itself toward the stator 34, causing the rotation 33 of the rotor 26 in the counterclockwise direction in motion toward the stator 34. In the frame of reference of the rotor 26, the magnetic forces of attraction between the electromagnet 28A and the stator 34 is a motive force that generates the rotation 33 about the axle 27. Simultaneously, with the action at a distance from the magnetic source, the magnetic forces of attraction pull the electromagnet 28A toward the stator 34 to produce the equal and opposite reaction force 37 in the stationary stator 34 in accordance with Newton's third law. The electromagnet 28A pulls on the stator 34, and the stator 34 pulls on the electromagnet 28A. Both, the electromagnet 28A and the stator 34 pull on each other toward each other. Since the stator 34 is mounted on the stator member 31, and the stator member 31 is mounted on the base frame 32, the reaction force 37 also acts on the base frame 32. In the frame of reference of the rotatable rotor 26, the pulling of the electromagnet 28A toward the stator 34 with the magnetic forces of attraction; produces a torque that rotates the rotor 26 toward the stator 34 in the direction of the rotation 33. The action of the electromagnet 28A on the stator 34; the act of pulling itself toward the stator 34 with the magnetic forces of attraction generates in the stator 34 the equal and opposite reaction force 37 in accordance with Newton's third law. As an inertial frame of reference in the base frame 32, the stator 34 is stationary and cannot move in reference to the frame 32. In contrast, relative to the base frame 32, the electromagnet 28A is in the frame of reference of the rotatable rotor 26; and in the platform of the frame 32, the spinning rotor 26 is a non-inertial frame of reference. The combination of the stationary frame of reference of the stator 34, and the non-inertial frame of reference of the rotor 26 with the electromagnets 28A-28L, and the linking of Newton's third law of motion with the magnetic field, shows the proper combinatory relationship between an inertial frame of reference and a rotatable non-inertial frame of reference to produce the propulsive reaction force 37. The synergy of the action at a distance from the source with the magnetic forces produced by the electromagnets 28A-28L, between the non-inertial frame of reference produced by the spinning rotor 26 for the electromagnets 28A-28L and the stationary frame of reference of the stator 34, generates the reaction force 37 in accordance with Newton's third law of motion.

FIG. 3

In the frame of reference of the rotor 26, the magnetic forces of attraction between the energized electromagnet 28A and the stator 34, is a motive force that generates the rotation 33 about the axle 27. A single arrow shows the tangential force 38 acting on the rotor 26 to produce the torque that generates the counterclockwise rotation 33 of the rotor 26. The vector force 38 represents the tangential force component of the magnetic forces of attraction between any energized electromagnets 28A-28L and the stator 34, in the particular example of FIG. 3, between the electromagnet 28A and the stator 34. The vector force 38 acts on the rotor 26 in the same manner as the tangential force 22 acts on the rotor 20 in FIG. 1. The radial displacement of the electromagnets 28A-28L on the rotor 26 is a moment arm that combined with the tangential force 38 generates the torque that drive the gyration of the electromagnets 28A-28L in the rotor 26 to travel round in orbit about the axle 27. In the frame of reference of the rotor 26, the center of revolution is the axle 27. In the rotor 26, the electromagnets 28A-28L, are displaced a radial distance away from the axle 27. Since the magnetic forces of attraction originate in the energized electromagnet 28A, then the magnetic forces of attraction generated by any energized electromagnets 28A-28L also have a similar radial displacement from the axle 27. The radial displacement of the energized electromagnet 28A in the rotor 26, constitutes a moment arm that produce the torque that generate the rotation 33 of the rotor 26 carrying the electromagnets 28A-28L in orbit about the axles 27. The spinning rotary motion of the rotor 26 about the axle 27, makes the rotor 26 a non-inertial frame of reference for the electromagnets 28A-28L. Thus the operation of the electromagnets 28A-28L and the magnetic field with the magnetic forces the electromagnets 28A-28L generate occurs in the non-inertial frame of reference of the spinning rotor 26. The direction of the reactive force 37 is of equal magnitude to the magnetic forces that generate it and opposite in direction, as can be seen in the drawing with the directions of the vectors for the force 38 and the propulsive force 37.

FIG. 4

Figure 4:
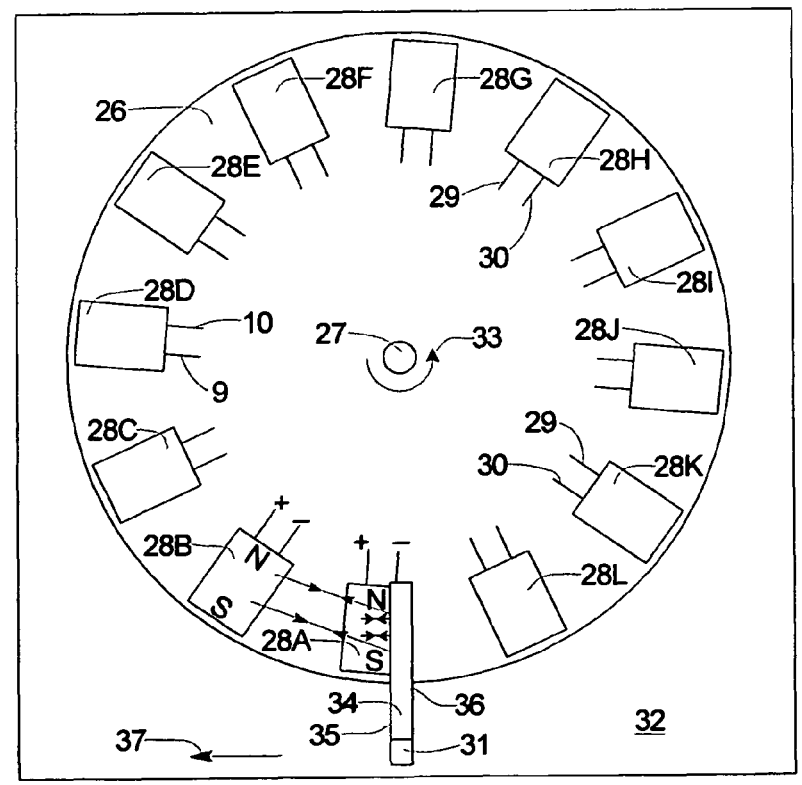
FIG. 4 is a continuation of FIG. 2 showing the magnetic forces of attraction of two simultaneously energized electromagnets producing a magnetic field in the rotor to interact with the stator.

FIG. 4 shows the further displacement to the right by the electromagnet 28A in the direction of the stator 34, in relation to the previous position in FIG. 2. The energized electromagnet 28A is now closer to the stator 34. The magnetic forces of attraction between the electromagnet 28A and the stator 34 drove the displacement of the rotor 26 to the right, placing the electromagnet 28A in a position closer to the stator 34. Simultaneously, a second electromagnet 28B, now closer to the stator 34, is energized with the same magnetic polarity as the electromagnet 28A. Both electromagnets 28A and 28B now have the same magnetic field polarity as shown with the symbols for N and S. Both electromagnets 28A and 28B generate magnetic forces of attraction toward the stator 34, as shown with sets of double arrows pointing toward each other. Since the magnitude of the magnetic forces of attraction varies inversely with the square of the distance from the source, the magnetic forces of attraction between the electromagnet 28A and the stator 34 are stronger than the magnetic forces of attraction between the stator 34 and the farther away electromagnet 28B. With the magnetic forces of attraction of the two electromagnets 28A and 28B acting simultaneously on the stator 34, the sum of the magnetic forces of attraction for both electromagnets 28A and 28B yield an increase in the magnitude of the propulsive force 37. The increase in the magnetic forces of attraction toward the stator 34 also increases the torque driving the rotation 33, and the frequency or the speed of gyration of the rotor 26 about the axle 27, and the magnitude of the propulsive force 37 in the stator 34.

FIG. 5

Figure 5:
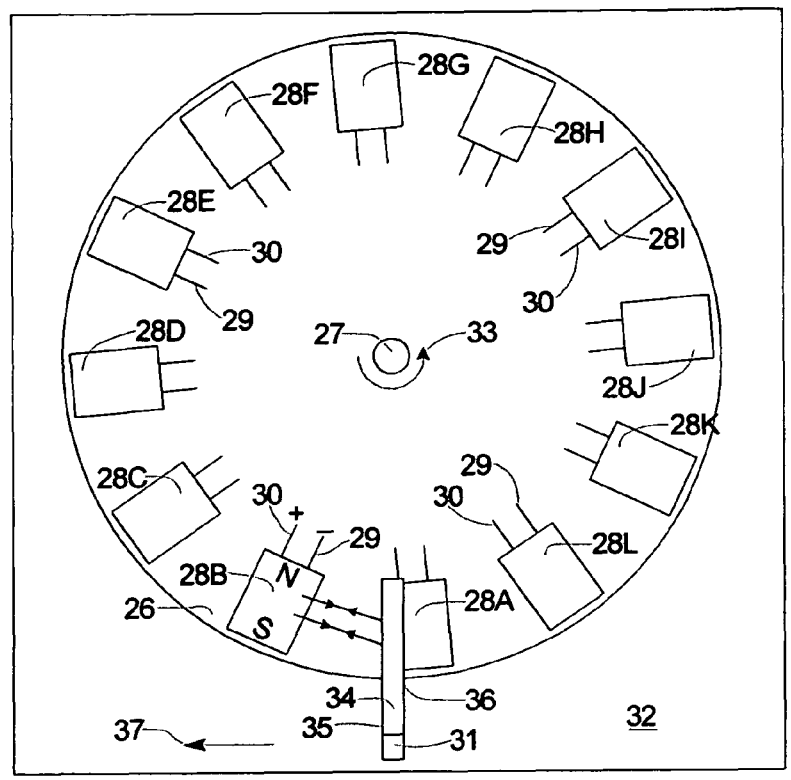
FIG. 5 is another view of the electron magnetic drive in FIG. 4 showing a further rotational displacement of the rotor to the right relative to the previous position in FIG. 4.

FIG. 5 is a further displacement to the right brought about by the counterclockwise rotation 33 of the rotor 26, placing the electromagnet 28B closer to the stator 34 in relation to the previous position in FIG. 4. While at the same time, the rotation 33 of the rotor 26 displaces the electromagnet 28A past the stator 34. In this new position, FIG. 5 indicates that at a predetermined position between the leading side 35 and the trailing side 36, the electromagnet 28A is de-energized and does no generates the necessary magnetic flux to act on the stator 34. In the example, only the magnetic forces of attraction of the energized electromagnet 28B act on the stator 34 to continue with the output of the reaction force 37 in accordance with Newton's third law. For example, for the electromagnet 28A, in on cycle of operation about the stator 34, the electromagnet 28A starts by energizing to interact with the stator 34 to generate the reaction force 37 as described. After passing the stator 37, the electromagnet 28A de-energizes. The rotation 33 drives the gyration of the rotor 26 allowing the de-energized electromagnet 28A to complete an orbit about the axle 27 until the electromagnet 28A approaches once again the stator 34 to start a new cycle of interaction with the stator 34. The magnetic cycle of operation as the electromagnet 28A is a repetitive operation with all the electromagnets 28A-28L during each cycle of revolution about the axle 27. The force 37 acts on the frame 32 as a propulsion force, in such a manner that if the base frame 32 were mounted on wheels, the entire propulsion platform of the electron magnetic drive 25 will propel itself forward in the direction of the propulsive force 37. Similarly, if the magnetic drive 25 is instead mounted on the frame of a vehicle, such as an airplane, a car, or a truck, the propulsive force 37 will propel the vehicle in the direction of the reaction force 37. The propulsive capabilities of the reaction force 37, is an object of the electron magnetic drive 25 that makes it useful for propulsion.

FIG. 6

Figure 6:
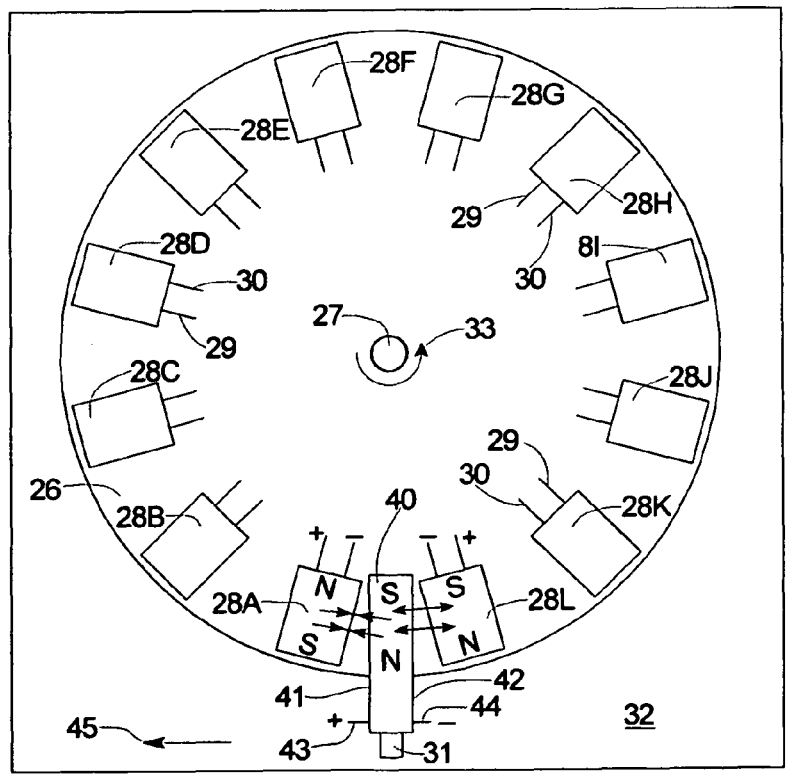
FIG. 6 shows another embodiment of the electron magnetic drive with the modification comprising a stator electromagnet interacting with two energized electromagnets in the rotor to produce a reaction in the stator electromagnet in accordance with Newton's third law.

FIG. 6 is another embodiment of the method of propulsion; in the form of an improved electron magnetic drive 39, a modified version of the magnetic drive 25 with the new improvements comprising, the replacement of the stator 34 with a new stator electromagnet 40. The electromagnet 40 has a leading side 41 and a trailing side 42, and power input terminals 43 and 44. The electromagnet 40 is mounted on the support member 31. When energized with electricity, the terminals 43 and 44 are marked with the plus (+) and minus (−) signs. The magnetic drive 39 employs the magnetic attraction and repulsion forces between the corresponding energized rotor electromagnets 28A-28L, and the energized stationary electromagnet 40 to produce a reaction force 45 as the end result of Newton's third law. With the magnetic field, through the action at a distance from the magnetic source, the magnetic field of the electromagnets 28A-28L interact with the magnetic field of the electromagnet 40 to produce a reaction in accordance with Newton's third law, the reaction force 45. In the context of the invention, action at a distance means, the source or sources of magnetic field and the stator are not in direct physical contact with each other, there is a gap in between.

In FIG. 6, the electromagnet 28A, the electromagnet 28L and the stator electromagnet 40 are electrically energized to produce the magnetic fields with the magnetic polarities shown in the diagram. The electromagnet 28A is in a position to the left of the stator electromagnet 40 facing the leading side 41. The electromagnet 28L is to the right of the trailing side 42. As the rotor 26 gyrates about the axle 27 with the rotation 33, the North Pole N of the electromagnet 28A is attracted to the South Pole S of the electromagnet 40; and the South Pole S of the electromagnet 28A is attracted to the North Pole N of the electromagnet 40. The magnetic forces of attraction between the energized electromagnet 28A and the energized electromagnet 40 are shown with two sets of double arrows pointing toward each other. In the drive 39, the magnetic forces of attraction and repulsion are the motive forces that generate magnetic vector force components that produce the torque to drive the rotation 33 of the rotor 26 to carry the electromagnets 28A-28L in orbit about the axle 27.

In the frame of reference of the pivotally mounted rotor 26, the magnetic forces of attraction between the electromagnet 28A and the electromagnet 40 is a motive force that contributes to the torque that drives gyrations of the rotor 26 about the axle 27, as shown with the direction of the rotation 33 in relation to the axle 27.

In the interaction between the electromagnet 40 and the electromagnet 28L, the magnetic North Pole N of the electromagnet 28L repels the magnetic North Pole N of the electromagnet 40; and the magnetic South Pole S of the electromagnet 28L repels the magnetic South Pole S 40 and the moving electromagnet 28L, are shown with two sets of double arrows pointing away from each other, and generate the magnetic repulsion force components that generate part of the torque that contributes to the momentum that drives the rotation 33 of the rotor 26.

In the frame of reference of the stationary electromagnet 40, the magnetic forces of attraction between the electromagnet 28A and the electromagnet 40 contribute to the total magnitude of the propulsive force 45. Similarly, the magnetic interaction between the electromagnet 40 and the electromagnet 28L also generate magnetic repulsion forces that also contributes to the total magnitude of the propulsive force 45. In the electromagnet 40, the reaction to the magnetic forces of attraction between the electromagnet 28A and the electromagnet 40, and the magnetic forces of repulsion between the electromagnet 40 and the electromagnet 28L produce the reaction force 45. The force 45 is the propulsive thrust output of the drive 39. The force 45 is a reaction in the stationary electromagnet 40 that occurs as a response to the magnetic interaction between the magnetic field from the electromagnets 28A-28L in the rotor 26, and the energized electromagnet 40, a response in accordance with Newton's third law.

FIG. 7

Figure 7:
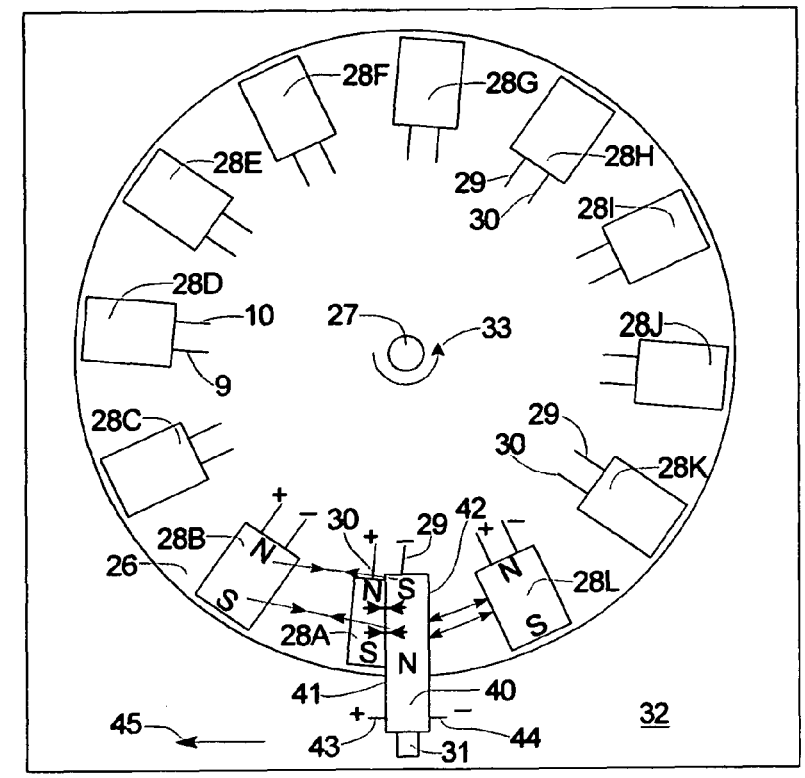
FIG. 7 is a continuation of FIG. 6 showing the energized stator electromagnet interacting with three energized electromagnets in the rotor.

As the magnetic forces of attraction and repulsion between the electromagnet 28A, the electromagnet 40, and the electromagnet 28L propel the rotation 33 about the axle 27, the energized electromagnet 28A moves closer to the energized electromagnet 40, and the energized electromagnet 28L moves farther away from the energized electromagnet 40. At the same time, relative to its former position in FIG. 6, the electromagnet 28B moves closer to the electromagnet 40, becoming energized at a predetermined distance from the electromagnet 40. The energized electromagnet 28B produces a magnetic field that generates the additional magnetic forces of attraction in its interaction at a distance with the energized electromagnet 40. The attraction between the electromagnet 28B and the electromagnet 40 is shown with two sets of double arrows pointing toward each other. The magnetic field is marked with the North N and South S poles. FIG. 7 also shows, in the new position relative to the electromagnet 40, part of the electromagnet 28A is within the borders of the leading side 41 and the trailing side 42. At the same time, the gyrations of the rotor 26 relocate the energized electromagnet 28L a distance farther away from the electromagnet 40. As a general rule, the magnitude of the magnetic field and therefore the magnetic forces of attraction and repulsion increase and decrease with the square of the distance from the source. As the electromagnet 28A and the electromagnet 28B move closer and closer to the electromagnet 40, the forces of attraction between the electromagnet 28A, the electromagnet 28B, and the electromagnet 40 continues to increase, becoming stronger with decreasing distance. In the same manner, the strength of the magnetic forces of repulsion between the electromagnet 28L and the electromagnet 40 continues to decrease as the electromagnet 28L increases its distance away from the electromagnet 40. The forces of attraction and repulsion produced by the electromagnet 28A, the electromagnet 28B and the electromagnet 28L in the rotor 26 interact with the electromagnet 40 to produce the propulsive force 45 as the reaction and the resultant of Newton's third law.

FIG. 8

Figure 8:
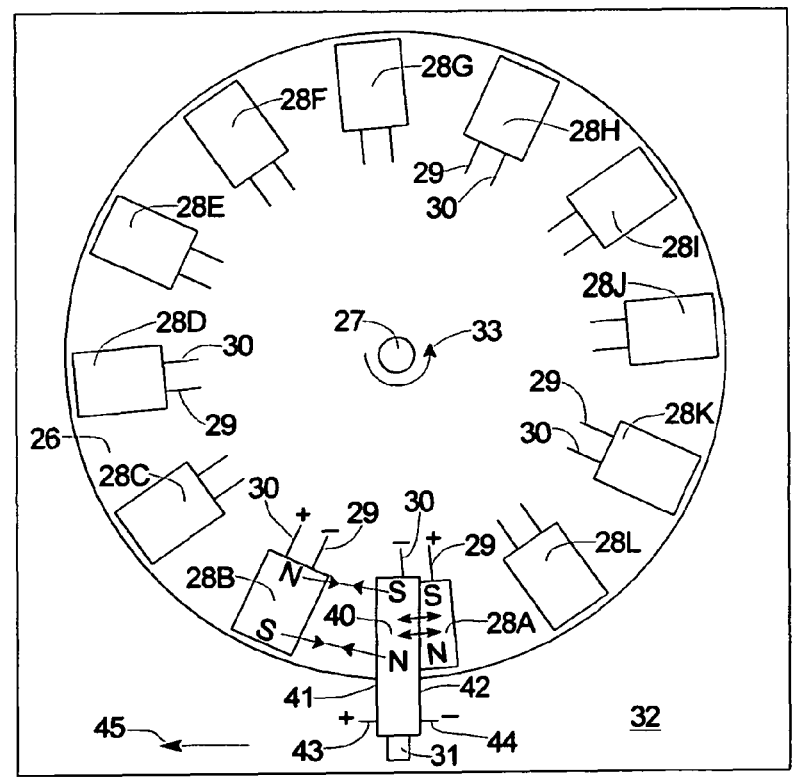
FIG. 8 shows the stator electromagnet interacting with two energized electromagnets in the rotor, with the rotor electromagnets in a new displaced position relative to the previous position in FIG. 7.
Figure 9:
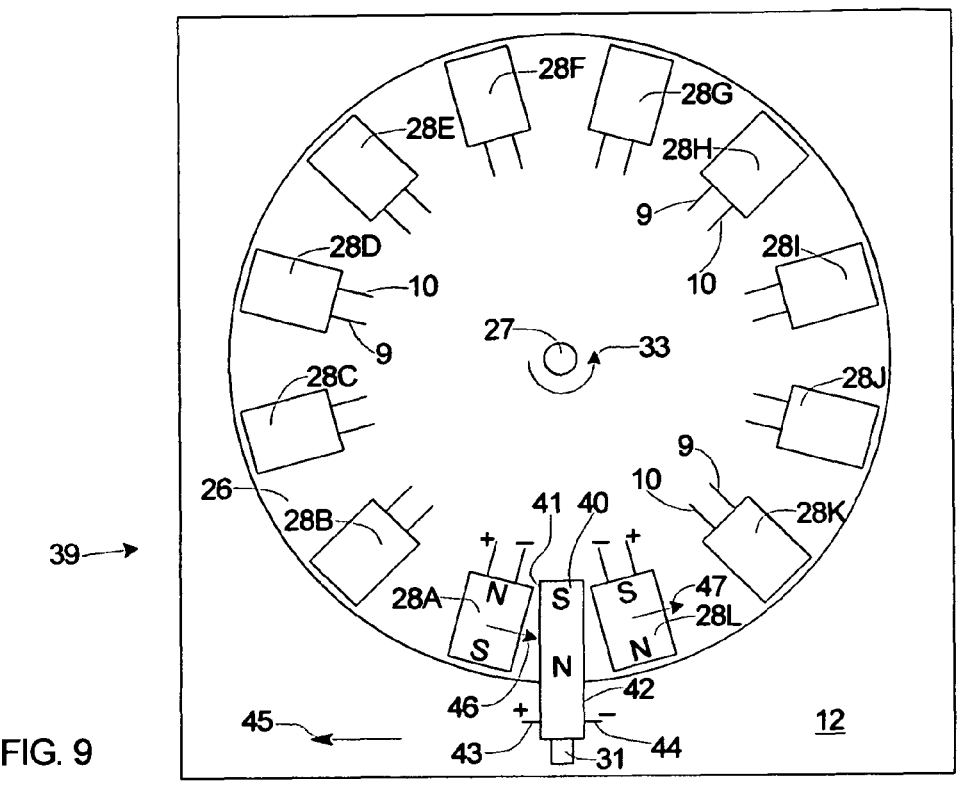
FIG. 9 illustrates the tangential vector force components produced by the magnetic forces of attraction and repulsion in the interaction between the energized electromagnets in the rotor and the energized stator electromagnet.

FIG. 8 is a further advance in the displacement of the energized electromagnet 28A toward the right as a result of the rotor 26 counterclockwise gyrations about the axle 27. At a predetermined moment during the counterclockwise rotation 33 of the rotor 26, between the leading side 41 and the trailing side 42, the electromagnet 28A go through a change in magnetic polarity to duplicate the magnetic polarity of the electromagnet 40. Like poles repel like poles, with the change in magnetic polarity, the magnetic South Pole S of the electromagnet 28A repels the magnetic South Pole S of the electromagnet 40, and the magnetic North Pole N of the electromagnet 28A repels the magnetic North Pole N of the electromagnet 40. In the electromagnet 40, the interaction between like magnetic poles produces a magnetic repulsion force between the electromagnet 28A and the electromagnet 40. The repulsion forces are shown with two sets of double arrows that point away from each other. At the same time, at a predetermined moment during the rotation 33 of the rotor 26, the electromagnet 28L become de-energized, as shown with the absence of magnetic poles in the electromagnet 28L. FIG. 8 also shows the electromagnet 28B at a new displaced position closer to the electromagnet 40, in relation to its former previous position in FIG. 7. In the rotor 26, the magnetic forces of attraction between the electromagnet 28B and the electromagnet 40, and the magnetic forces of repulsion between the electromagnet 40 and the electromagnet 28A continues to drive the the momentum of the rotation 33 of the rotor 26. In the stationary electromagnet 40, the magnetic forces of attraction and repulsion continue to produce the propulsive reaction force 45 in accordance with Newton's third law.

FIG. 9

In the frame of reference of the pivotally mounted rotor 26, the tangential vectors for the magnetic attraction force 46 and the magnetic repulsion force 47 are motive forces that generate the torque to drive the momentum of the rotation 33 of the rotor 26 spinning about the axle 27, just the same as the tangential force 22 shown in FIG. 1 drives the gyrations of the rotor 20 about the axle 21. In the rotor 26, the magnetic forces of attraction and repulsion between the electromagnets 28A, 28B, and 28L, and the electromagnet 40, generate tangential forces that produce the torque to drive the rotation 33 of the rotor 26.

In the frame of reference of the stationary electromagnet 40, the magnetic forces of attraction and repulsion between the electromagnet 28A, the electromagnet 28B, the electromagnet 28L and the electromagnet 40, generate on the stationary electromagnet 40 the reaction force 45 as an equal and opposite force to the torque driving the rotation 33. The same interactions the electromagnet 28A, the electromagnet 28B, and the electromagnet 28L goes through with the electromagnet 40, the same interactions also occurs with the electromagnets 28C-28K. During every cycle of revolution the rotor 26 completes about the axle 27. When energized, all the electromagnets 28A-28L in the rotor 26 also go through the same process in order to interact with the energized electromagnet 40.

In the rotor 26, the magnetic forces of attraction and repulsion generate the torque that drives the momentum of the rotation 33 about the axle 27. The rotation 33 of the rotatable rotor 26 generates a non-inertial frame of reference for the operation of the electromagnets 28A-28L and for the magnetic field the energized electromagnets 28A-28L produce. The magnetic field of any of the energized electromagnets 28A-28L operate in the non-inertial frame of reference of the spinning rotor 26 to impose the magnetic field forces present upon the stationary inertial frame of reference of the energized electromagnet 40. As a source of magnetic field, when energized, the magnetic field produced by the electromagnets 28A-28L produce an action at a distance from the source that produce a reaction on the stationary electromagnet 40. Action at a distance means that the electromagnets 28A-28L and the electromagnet 40 are not physically touching, there is a gap in between. Similarly, the energized electromagnet 40 also imposes the magnetic forces in its magnetic field on the electromagnets 28A-28L. In the stationary electromagnet 40, the force 45 is the equal and opposite reaction to the force that generate the rotation 33 in the rotor 26. The interchange of the magnetic forces of action and reaction between the electromagnets 28A-28L and the electromagnet 40 occur in accordance with Newton's third law.

Though the action at a distance from the magnetic source, the magnetic forces of attraction between an energized electromagnets 28A-28L and the energized electromagnet 40; attract each other toward each other, pulling each other toward each other. Correspondingly, the magnetic repulsion forces between an energized electromagnets 28A-28L and the energized electromagnet 40 repel each other from each other, pushing away each other from each other. All this interaction occurs in accordance with Newton's third law. The action at a distance from the source from the magnetic forces of attraction and repulsion produced with the magnetic field generate in the stationary electromagnet 40 a reaction, the propulsive force 45.

FIGS. 6-9, illustrate the proper combinatory relationship between two frames of reference linked by a magnetic field that generates the magnetic forces of attraction and repulsion between the two frames of reference, in this case, between a rotor and a stator. One frame of reference is provided by the pivotally mounted rotor 26 with the electromagnets 28A-28L, and the other frame of reference is the stationary electromagnet 40. In the magnetic drive 39, through action at a distance, the magnetic forces of attraction and repulsion produce the propulsive reaction force 45 in accordance with Newton's third law of motion. The gyrations of the rotor 26 generate a non-inertial frame of reference for the electromagnets 28A-28L. In the rotating frame of reference of the rotor 26, the electromagnets 28A-28L generate a temporary magnetic field in the vicinity of the stator electromagnet 40 to interact with the electromagnet 40. The traffic of energized electromagnets 28A-28L approaching the leading side 41 of the electromagnet 40 with unlike magnetic polarities, attract the unlike polarities of the stationary electromagnet 40. In the rotor 26, the magnetic attraction force generates a magnetic attraction force 46 vector that produces a torque to drive the gyrations of the rotor 26 about electromagnets 28A-28L and the energized electromagnet 40 generates an equal and opposite reaction to the attraction force 46 in accordance with Newton's third law of motion which states that "for every action there is an equal and opposite reaction." The reaction produced by the magnetic attraction force 46 contributes to the total magnitude of the propulsive force 45.

Likewise, the traffic flow of energized electromagnets 28A-28L with like magnetic polarities moving away from the energized electromagnet 40 repel the like magnetic polarities of the energized electromagnet 40 and generate magnetic repulsion forces between the energized electromagnets 28A-28L and the energized electromagnet 40. In the spinning rotor 26, the repulsion forces generate a vector force component shown as the vector of the magnetic repulsion force 47. The magnetic repulsion forces generate a torque that contributes to drive the gyrations of the rotor 26 about the axle 27. In the stator electromagnet 40, through action at a distance, the magnetic repulsion force generates an equal and opposite repulsive reaction force that contributes to the total propulsive strength of the reaction force 45. In the electromagnet 40, the repulsion force 47 generates an equal and opposite reaction as predicted and expected by Newton's third law of motion.

As the electromagnets 28A and 28B in the rotor 26 pull themselves with the magnetic forces of attraction toward the electromagnet 40, the electromagnets 28A and 28B produce an equal and opposite reaction in the electromagnet 40 that contributes to the total magnitude of the reaction force 45 in compliance with Newton's third law.

Similarly, as the electromagnet 28A traverse the electromagnet 40, and push against the electromagnet 40 with the magnetic forces of repulsion, the electromagnet 40 also push against the electromagnet 28A. The against the electromagnet 40 repulsion force produces an equal and opposite reaction force in the stator electromagnet 40 that pushes the electromagnet 28L and the electromagnet 28A away from the electromagnet 40. The push against the electromagnet 40 with the magnetic forces of repulsion contributes to the total magnitude of the reaction force 45. The magnetic forces of attraction and repulsion between electromagnets 28A, 28B, 28L in the rotor 26, and the stator electromagnet 40, are actions at a distance that generate in the stator electromagnet 40 the propulsive reaction force 45 in accordance with Newton's third law. All the electromagnets 28A-28L in the rotor 26 go through the same operation. In the magnetic drive 39, the total strength of the propulsive force 45 is equal to the sum of the contributions made by the magnetic forces of attraction and repulsion between the electromagnets 28A-28L and the stator electromagnet 40. If the magnetic drive 39 were mounted to the frame of a vehicle, such as an airplane, a car, or a truck, the drive 39 will propel the entire vehicle with the drive 39 in the direction of the reaction force 45.

FIGS. 5-9 exemplify the synergy of the combinatory relationship between two frames of reference linked by a magnetic field that employ the magnetic forces present in the magnetic field to produce a propulsive reaction force in accordance to Newton's third law of motion.

FIG. 10

Another embodiment of the method is an improved electron magnetic drive 48 comprising the rotor 26 with a plurality of permanent magnets 49A-49L mounted about the periphery of the rotor 26 in an alternating radial orientation of North-South magnetic poles, a stator electromagnet 50 with power input terminals 51 and 52, a leading side 53 and a trailing side 54, mounted on the member 31 in the frame 32, an electronic controller 55 connected to the electromagnet 50 by a connection cable 56, a sensor 57 coupled to the controller 55 by way of a connecting cable 58. The sensor 57 detects the magnetic polarity of the magnets 49A-49L passing by and transmits a signal to the controller 55 to bring about a change in the magnetic polarity of the electromagnet 50. Internally or externally, the electromagnet 50 includes the appropriate mechanisms such as electronic circuits to change the magnetic polarity of the electromagnet 50. The change in magnetic polarity of the electromagnet 50 cooperate with the corresponding magnetic polarity of the magnets 49A-49L to interact with the electromagnet 50 in order to produce a propulsive reaction force 59 in accordance with Newton's third law.

Operation

FIGS. 10, 11, 12

Beginning with FIG. 10, the stator electromagnet 50 is electrically energized to produce the magnetic field with the corresponding magnetic polarities in order to produce magnetic forces of attraction with the magnet 49A, and magnetic forces of repulsion with the magnet 49L. The magnet 49A is at a predetermined distance away from the electromagnet 50. Through action at a distance, the magnetic field of the permanent magnet 49A, approaching the leading side 53, interacts with the magnetic field of the energized electromagnet 50 to produce a magnetic attraction force that attracts the magnet 49A to the electromagnet 50, and simultaneously attract the electromagnet 50 to the magnet 49A. Both, the magnet 49A and the electromagnet 50 attract each other toward each other. The magnetic forces of attraction are produced by the unlike magnetic poles that attract each other toward each other. The magnet 49A North magnetic pole N attracts the electromagnet 50 South magnetic pole S. Likewise; the magnet 49A South magnetic pole S attracts the electromagnet 50 magnetic North pole N. Both, the magnet 49A and the electromagnet 50 magnetically attract each other toward each other. The magnetic attraction force between the magnet 49A and the electromagnet 50 is shown with two sets of double arrows. Each set of double arrows point toward each other. On the other side of the energized electromagnet 50, on the side of the trailing side 54, the magnetic polarity of the magnet 49L repels the energized electromagnet 50, and simultaneously, the electromagnet 50 repels the magnet 49L. The repulsion force between the magnet 49L and the electromagnet 50 is due to the like magnetic poles repelling each other. The magnetic forces of repulsion between the South magnetic pole S of the electromagnet 50; repels the South magnetic pole S of the magnet 49L. In the same manner, the North magnetic pole N of the electromagnet 50 repels the North magnetic pole of the magnet 49L. The magnetic forces of repulsion between the electromagnet 50 and the magnet 49L are shown with two sets of double arrows that point away from each other.

In the frame of reference of the rotor 26, the magnetic forces of attraction between the magnet 49A and the electromagnet 50 contribute to the torque that generates the rotation 33 of the rotor 26 in order to spin about the axle 27. Similarly, the magnetic forces of repulsion between the electromagnet 50 and the magnet 49L also contributes to the torque that spins the rotor 26 about the axle 27. As the process of magnetic attraction and repulsion is repeated by every magnets 49A-49L in the interaction with the electromagnet 50, the gyrations of the rotor 26 continues until the gyrations are stopped by de-energizing the electromagnet 50. For the rotor 26, the momentum of the rotation 33 generates a non-inertial frame of reference for the magnets 49A-49L and the magnetic field present in the magnets 49A-49L.

As the magnetic field of the magnet 49A, comes in contact and engages the energized electromagnet 50 with the magnetic field, the magnet 49A in the rotor 26 pulls itself toward the electromagnet 50 while at the same time, the electromagnet 50 pulls itself toward the magnet 49A. In the non-inertial frame of reference of the rotatable rotor 26, the magnetic forces of attraction generate a torque that contributes to start and maintain the gyrations of the rotor 26 about the axle 27. And simultaneously, the magnetic forces of repulsion also contribute to the torque that starts and maintain momentum of the rotations 33 of the rotor 26 with the magnets 48A-49L.

In the stationary frame of reference of the electromagnet 50, the magnetic forces of attraction between the stationary electromagnet 50 and the magnet 49A in the rotor 26, produce in the stationary electromagnet 50 a reaction in accordance to Newton's third law. In the same manner, the magnet 49A pull itself toward the electromagnet 50 with the magnetic forces of attraction, the electromagnet 50 also pull itself toward the magnet 49A. In the frame of reference of the pivotally mounted for rotation of the rotor 26, the magnetic forces of attraction generates the torque that generates the rotation 33 in one direction. In the frame of reference of the stationary electromagnet 50, the magnetic forces of attraction generate a reaction in the opposite direction that contributes to the total magnitude of the force 59.

Similarly, the magnetic forces of repulsion between the stationary electromagnet 50 and the moving away magnet 49L produce in the magnet 49L a repulsion force that thrust the magnet 49L to move away from the electromagnet 50. In the electromagnet 50, the magnetic repulsion force pushes the electromagnet 50 away from the magnet 49L. However, the electromagnet 50 is stationary and in the base frame 32 the thrust of the magnetic forces acts as a propulsive force. The reaction in the electromagnet 50 is in accordance with Newton's third law; and the sum of the reactions to the magnetic forces of attraction and repulsion in the electromagnet 50 generates the propulsive reaction force 59 accordingly.

FIG. 11

FIG. 11 shows the relative displacement of the magnet 49A in relation to its former position in FIG. 10 and the change in magnetic polarity the electromagnet 50 goes through. As the rotor 26 with the magnets 49A-49L gyrates counterclockwise with the speed of the rotation 33, the 57 detect the magnetic polarity of the magnet 49L and send a signal to the controller 55. At a predetermined moment during the movement of the magnet 49A between the leading side 53 and the trailing side 54, the electromagnet 50 changes its magnetic polarity to repel the magnet 49A away from the electromagnet 50, and simultaneously attract the magnet 49B. The change in magnetic polarity is synchronized by the controller 55. As the magnets 49A-49L go by, the sensor 57 detects the magnetic polarity of any of the passing by magnets 49A-49L, sends a signal to the controller 55 through the cable 58, and at a predetermined moment in time, the controller 55, through the cable 56 sends a synchronized signal to the electromagnet 50 to change again its magnetic polarity. The change in magnetic polarity corresponds to the necessary magnetic polarity needed to attract the magnet 49B and repel the magnet 49A. The magnetic forces of attraction between the magnet 49B and the energized electromagnet 50, and the magnetic forces of repulsion between the electromagnet 50 and the magnet 49A continues to maintain the propulsive thrust output of the drive 48 in the form of the propulsive force 59. The operation of attraction and repulsion with the electromagnet 50 is a continuously repetitive operation with each of the magnets 49A-49L in the rotor 26. In addition, in the rotor 26, the magnetic forces of attraction and repulsion produce the torque to drive the rotation 33. In the stationary electromagnet 50, the magnetic forces of attraction and repulsion continue to add to the total magnitude of the propulsive force 59 in accordance with Newton's third law. In the electromagnet 50, the propulsive force 59 is the equal and opposite reaction to the momentum of the torque driving the rotation 33 of the rotor 26.

FIG. 12

FIG. 12 is a continuation of the operation in FIG. 11. FIG. 12 displays the progressive movement of the electromagnet 49A after passing by the electromagnet 50. The gyrations of the rotor 26 brings the electromagnet 49B closer to the electromagnet 50 and at the same time displaces the electromagnet 49A farther away from the electromagnet 50, in relation to the previous positions shown in FIG. 11. As the electromagnet 49B gets closer to the electromagnet 50, the magnetic forces of attraction increase to drive the counterclockwise rotation 33 of the rotor 26. At the same time, the gyrations of the rotor 26 drive away the magnet 49A from the electromagnet 50 and as a consequence, the magnetic forces of repulsion between the energized electromagnet 50 and the electromagnet 49A decrease with increasing distance from the electromagnet 50. As each of the magnets 49A-49L interact with the electromagnet 50 in the same manner as the magnet 49A interacted with the electromagnet 50, the rotational frequency of the rotor 26 gyrations continues. The output of the reaction force 59 continues until the electromagnet 50 is completely de-energized. The magnetic forces of the magnets 49A-49L are actions at a distance that produce an equal and opposite reaction in the stationary electromagnet 50. The gyrations of the plurality of electromagnets 49A-49L interacting with the electromagnet 50 generates the reaction force 59 in the stator electromagnet 50. The utility of the electron magnetic drive 48 is the reactive force 59, useful for propulsion. If the magnetic drive 48 is installed in the frame of a vehicle such as a car or a truck, the platform will propel the vehicle with the reaction force 59.

FIG. 9, FIG. 10, FIG. 11, and FIG. 12 illustrate a proper combinatory relationship between the two frames of reference of the rotor 26 and the electromagnet 50 linked by the present in the permanent magnets 49A-49L and the electromagnet 50. With the interaction of the magnetic forces present in the magnetic field of the magnets 49A-49L and the electromagnet 50, the propulsive reaction force 59 is produced in accordance with Newton's third law of motion. One frame of reference is the rotatable non-inertial frame of reference represented by the spinning rotor 26 on which the magnets 49A-49L are mounted; and the inertial frame of reference of the stationary electromagnet 50. Both frames of reference are linked by the magnetic field of the magnets 49A-49L and the magnetic field of the energized electromagnet 50. The magnetic forces present in the magnetic fields of the permanent magnets 49A-49L and the energized electromagnet 50 produce magnetic attraction and repulsion forces between the like and unlike magnetic poles to produce the propulsive reactive force 59.

CONCLUSION, RAMIFICATION AND SCOPE

Similar in one commonality, the jet engine, the propeller, the rocket engine, the internal combustion engine with a drive train, and the electron magnetic drive as a new method of propulsion, they employ the same fundamental principle of physics. They all make use of Newton's third law of motion to produce the necessary reaction force of propulsion.

However, the similarity between these prime movers and the embodiment of a new method of propulsion in the electron magnetic drive ends there. The jet engine, the propeller, and the internal combustion engine with a drive train; employ a propellant from the external environment for propulsion. The exception is the rocket engine. The rocket carries its own propellant.

Exceptionally different from all other prime movers is the method of propulsion in the electron magnetic drive, useful for propulsion on land, air, water, and in the vacuum of space. It does not require propellant from the outside environment. And, unlike the rocket engine, the electron magnetic drive does not carry its own propellant for propulsion. Instead, the electron magnetic drive employs Newton's third law of motion with novelty. As a new method of propulsion, the electron magnetic drive employs the magnetic forces present in the magnetic field of permanent magnets and electromagnets to take advantage of the synergistic and dynamic relationship of Newton's third law of motion between the two frames of reference present in a spinning rotor and a stator linked by a magnetic field.

In addition to the embodiments disclosed above; there are additional embodiments useful for propulsion. For instance, in one embodiment of the drive 39, the stator electromagnet 40 can be replaced with a permanent magnet to produce the reaction force of propulsion.

In another embodiment of the drive 48, the electronic controller 55 with all its supporting hardware can be replaced with a commutator and at least two sets of two brushes each to control the required magnetic polarity change of the stator electromagnet 50. On the other hand, there are other suitable mechanisms to perform the same electric power distribution operation as well as sensing technology available to achieve the same end result.

An example of another embodiment of the drive 25, a second stator can be located 180° from the stator 34 to change the direction of the reaction thrust of the drive 25. In this example, the electromagnets 28A-28L can be energized to interact with the second stator only in such a manner that the direction of the reactive thrust of the second stator would be in the opposite direction as the direction of the reaction force 37. Additional stators can be added to change the direction of the reaction thrust accordingly. A similar approach is equally valid with the other embodiments of the method of propulsion.

In another embodiment, two units side by side counter rotating in opposing directions to cancel out each other gyroscopic moment is equally useful for propulsion.

In additional embodiments, the assembly of the rotor 26 with the magnets 49A-49L or the electromagnets 28A-28L can be assembled on the shaft of an electric motor or any other suitable power source to generate the reaction propulsion force as described in the method above. Moreover, a motor with gears to transfer power to the rotor for additional torque input can be added to aid the gyrations of the rotor 26.

Another embodiment relates to the use of the repulsion force only. For example, the electron magnetic drives 39 and 48 employ the magnetic forces of attraction and repulsion. These drives can be designed in an operation that employs the forces of magnetic repulsion only by energizing the stator electromagnet and the rotor electromagnets at the proper time.

Even though in the discussions of the method of propulsion, the preferred embodiments at this time are described with counterclockwise rotation, the method of propulsion is equally valid for embodiments with clockwise rotation.

Even though various specificities of the method of propulsion have been discussed in detail, it is not to be construed as limiting to those embodiments. The method of propulsion described in the following claims defines a unique theory. There are various alternatives, modifications and embodiments possible within the range of the invention and without departing from the scope of the appended claims and their legal equivalents.

I claim:
1. A method of propulsion, comprising:
(a) providing a base frame for mounting a rotor and a stator that cooperate and interact magnetically with each other to generate a propulsive reaction force,
(b) providing an axle mounted on said base as a center of revolution for the rotation of a rotor,
(c) providing a rotor pivotally mounted for rotation about said center of revolution,

(d) providing a source of magnetic field in said rotor to generate a magnetic field that interact magnetically with a stator to produce a propulsive reaction force, (e) providing a stator that consisting of only one stator pole to generate a propulsive reaction force in cooperation with said rotor, wherein said source of magnetic field mounted in said rotor generates a magnetic field for a predetermined time interval to interact magnetically with said only one stator pole of the stator wherein the interaction between said source of magnetic field of said rotor and said only one stator pole of the stator generates a propulsive reaction force in the stator.

2. The method in claim 1 wherein said rotor pivotally mounted for rotation about said center of revolution is symmetric about said center of revolution.

3. The method in claim 1 wherein said source of magnetic field in said rotor is a plurality of electromagnets.

4. The method in claim 1 wherein said only one stator pole of the stator is made of a magnetic permeable material.

5. A method of propulsion, comprising:

(a) providing a base frame for mounting a rotor and a stator that cooperate and interact magnetically with each other to generate a propulsive reaction force, (b) providing an axle mounted on said base as a center of revolution for the rotation of a rotor, (c) providing a rotor pivotally mounted for rotation about said center of revolution, (d) providing a source of magnetic field in said rotor to generate a magnetic field that interact magnetically with a stator to produce a propulsive reaction force, (e) providing a stator that consisting of only one stator pole to generate a propulsive reaction force in cooperation with said rotor, (f) providing a source of magnetic field in said only one stator pole of the stator to interact magnetically with the magnetic field from said rotor to produce a propulsive reaction force in said stator, wherein said source of magnetic field in said rotor generates a magnetic field for a predetermined time interval to interact magnetically with the magnetic field generated in said only one stator pole of the stator, wherein the magnetic interaction between said source of magnetic field in said rotor and said source of magnetic field in said only one stator pole of the stator generates a propulsive reaction force in the stator.

6. The method in claim 5 wherein said rotor pivotally mounted for rotation about said center of revolution is a rotor symmetric about said center of revolution.

7. The method in claim 5 wherein in said rotor said source of magnetic field is a plurality of electromagnets.

8. The method in claim 5 wherein said source of magnetic field of said only one stator pole of the stator is an electromagnet.

9. A method of propulsion, comprising:

a) providing a base frame for mounting a rotor and a stator that cooperate and interact magnetically with each other to generate a propulsive reaction force, (b) providing an axle mounted on said base as a center of revolution for the rotation of a rotor, (c) providing a rotor pivotally mounted for rotation about said center of revolution, (d) providing a source of magnetic field in said rotor to generate a magnetic field that interact magnetically with a stator to produce a propulsive reaction force, (e) providing a stator that consisting of only one stator pole to generate a propulsive reaction force in cooperation with said rotor, (f) providing a continuous source of magnetic field in said rotor to interact magnetically with a magnetic field in said only one stator pole of the stator to generate a propulsive reaction force in said stator, wherein said source of magnetic field in said only one stator pole of the stator generates the magnetic field for a predetermined time interval to interact magnetically with said rotor, wherein the magnetic interaction between said source of magnetic field in said rotor and said source of magnetic field in said only one stator pole of the stator generates a propulsive reaction force in the stator.

10. The method in claim 9 wherein said source of magnetic field in said only one stator pole of the stator comprises an electromagnet.

11. The method in claim 9 wherein said rotor is symmetric about said center of revolution.

12. The method in claim 9 wherein said source of magnetic field in said rotor comprises a plurality of permanent magnets.

\* \* \* \* \*